United States Patent [19]
McQueen

[11] Patent Number: 5,600,528
[45] Date of Patent: Feb. 4, 1997

[54] HEATER CUT OFF CIRCUIT AND METHOD

[75] Inventor: Malcolm M. McQueen, Fallbrook, Calif.

[73] Assignee: Fluid Components Intl, San Marcos, Calif.

[21] Appl. No.: 414,117

[22] Filed: Mar. 31, 1995

[51] Int. Cl.⁶ ....................................... H02H 5/04
[52] U.S. Cl. ............................. 361/103; 73/295
[58] Field of Search .................. 361/103, 106; 73/292, 295

[56] References Cited

U.S. PATENT DOCUMENTS

| | | | |
|---|---|---|---|
| 3,372,590 | 3/1968 | Sterling | 73/204 |
| 3,898,638 | 8/1975 | Deane et al. | 340/243 |
| 3,921,450 | 11/1975 | Pfister | 73/295 |
| 4,103,319 | 7/1978 | Crain et al. | 361/106 |
| 4,246,468 | 1/1981 | Horsma | 219/553 |
| 4,299,126 | 11/1981 | Heuwieser et al. | 73/295 |
| 4,357,830 | 11/1982 | Kohama et al. | 73/204 |
| 4,449,403 | 5/1984 | McQueen | 73/295 |
| 4,740,671 | 4/1988 | Kuroda et al. | 219/497 |
| 5,178,009 | 1/1993 | Arekapudi et al. | 73/292 |

*Primary Examiner*—Todd Deboer
*Attorney, Agent, or Firm*—Baker, Maxham, Jester & Meador

[57] ABSTRACT

A safety device for heated sensors. A signal representing a threshold voltage is compared with a signal from the sensor representing sensor temperature. If the latter is greater than the threshold signal, a switch is opened to remove power from the means for heating the sensor. The normal state of the switch is closed, so after cooling, heat is again applied to the sensor.

16 Claims, 2 Drawing Sheets

HEATER CUT OFF CIRCUIT AND METHOD

BACKGROUND

1. Field of the Invention

This invention generally relates to thermal sensors for determining liquid level or fluid flow for, any type of fluid liquid, and more particularly concerns a safety device and method for preventing damage to such a thermal sensor which could result from over heating, or to protect related media, equipment or the environment from an over temperature heating means.

2. Discussion of the Related Art

Differentially heated sensors are widely employed for sensing the presence of liquids at predetermined levels in containers and for sensing flow and mass flow velocity of all types of fluids in vessels. The basic principle employed in the use of differentially heated sensors is that a temperature sensitive element such as a resistance type sensor comprising a heated sensor is cooled by the flow of fluid or by immersion in liquid. In the case of a resistance type sensor a low current or voltage applied to a reference (unheated) sensor provides an electrical reference signal. The larger current or voltage necessary to differentially heat the heated sensor above the reference level provides a measurement electrical signal when the phenomenon being sensed is present. For example, there is much greater cooling effect caused by the presence of liquid, as compared to a gas, or by rapidly moving fluid, on the heated sensor than results from stagnant or slow moving fluids.

Thus an unheated sensor in liquid provides a reference or ambient electrical signal. A similar heated sensor provides a different signal because of the cooling effect of the liquid. Typically, a relatively low voltage or current would be applied to the reference sensor which is sufficient to obtain a reading without elevating the sensor temperature above the media temperature. The measurement sensor is heated and the additional current or voltage necessary to obtain a predetermined elevated temperature is an indication of whether or not the heated sensor is immersed in liquid. If it is in air or gas, it will reach a much higher temperature relatively quickly, thereby increasing the resistance of the sensor.

Typically, the sensor is a resistance temperature detector (RTD) and it may be distributed or elongated, or it may be a "point" or chip RTD, having no appreciable linear dimension. Alternatively, thermistors or thermocouples or other electro thermal device may be used in thermal sensors. Distributed RTD's are particularly useful in measuring liquid level because any portion may be immersed and the effective resistance change indicates the depth of the liquid.

There are many examples of uses of thermal sensors and a few are listed here for reference purposes. They may apply to either liquid level sensing and fluid flow sensing or both. A sampling of such U.S. patents include: U.S. Pat. Nos. 3,898,638; 4,449,403; 3,372,590; 3,921,450; 4,246,468; 4,299,126; and 4,357,830.

In some instances a normally liquid-immersed sensor used to measure fluid flow rates may in effect, "run away" if unexpectedly exposed to gas. That is, without the substantial cooling effect provided by the liquid being sensed, the thermal device may rapidly heat to damage or destruction. In volatile gas environments, it may heat to an explosive temperature. These possibilities are especially prevalent in instances where operator discretion is permitted in setting the temperature or heating level of the heated sensor. A multi-purpose thermal sensor may need a relatively low level of heat to detect liquid/gas level in a container. A fluid with a high flow rate and high specific heat and at an elevated temperature may require a much higher temperature of the heated sensor in order to obtain the contrast necessary for the sensor to detect the rate of the fluid flow.

A thermal sensor with a variable power heater can easily be set too high for the circumstances, quickly resulting in a dangerous situation or even damage when the liquid is not present around the heated sensor. A potentially dangerous or ignition temperature could be reached in as short a time as one second, under extreme circumstances.

SUMMARY OF THE INVENTION

A primary purpose of this invention is to provide a safety feature for sensors of the heated type discussed above.

Broadly speaking, the invention provides a cut off feature to disconnect electrical power from the heating element of the thermal sensor. More particularly, the circuit of the invention provides two inputs to an electrical comparator, one representing a reference or threshold temperature, and the other representing the temperature of the heated sensor. In the preferred system when the heated sensor signal exceeds the reference signal, indicating a comparatively elevated temperature, a signal from the comparator activates a switch, removing electrical power from the heater. An absolute temperature sensor could also be employed whereby the actual temperature of the heated sensor, and not the differential type as above, is used to shut off the heater power if a high temperature is being experienced.

The threshold signal can be preset, that is, fixed at the factory for specific uses. Alternatively, it may be variable and modifiable in the field to suit the circumstances being monitored. Likewise, the power applied to the heater element can be preset or field selectable.

The invention may be employed with a variety of types and configurations of thermal sensors. It is effective with any sensor which requires applied heat to function, and which could cause damage or be damaged by an overheat condition.

BRIEF DESCRIPTION OF THE DRAWING

The objects, advantages and features of this invention will be more readily perceived from the following detailed description, when read in conjunction with the accompanying drawing, in which.

DETAILED DESCRIPTION OF THE PREFERRED EMBODIMENTS

Figure 1:
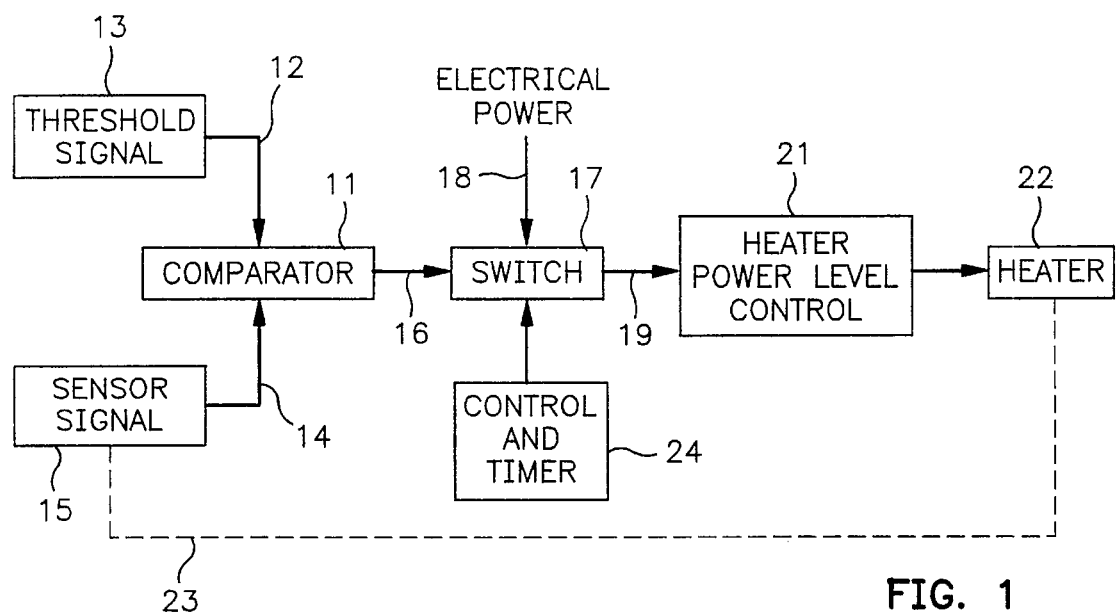
FIG. 1 is a functional block diagram of the system of the invention.

With reference now to the drawing and more particularly to FIG. 1 thereof, there is shown a block diagram of the essential features of the invention. Comparator 11 is a relatively conventional device having input 12 from threshold signal generator 13 and input 14 from heated sensor 15. If the signal from sensor 15 does not exceed the threshold signal, there is no signal 16 out of the comparator. In its normal condition, switch 17 is closed. If the sensor signal exceeds the threshold signal by a predetermined amount, signal 16 causes switch 17 to trip or open, thereby disconnecting power 18 from the heater through line 19. After the heated sensor cools down, switch 17 reconnects power to the heating means.

In the preferred embodiments operator adjustable heater power level control 21 is employed to adjust the heat level of heater 22, which is coupled to sensor 15 through thermal coupling 23.

In some embodiments of sensors, the sensor is heated and cooled cyclically. In those cases control and timer 24 is used to cycle the heating of the sensor. It should be noted that control 24 may not be necessary in all instances. It may be also employed with a sensor in circumstances where the safety circuit of FIG. 1 is not used, because some sensors are configured to be intermittently heated and cooled on a regular timed sequence and over heating is controlled by other means.

Figure 2:
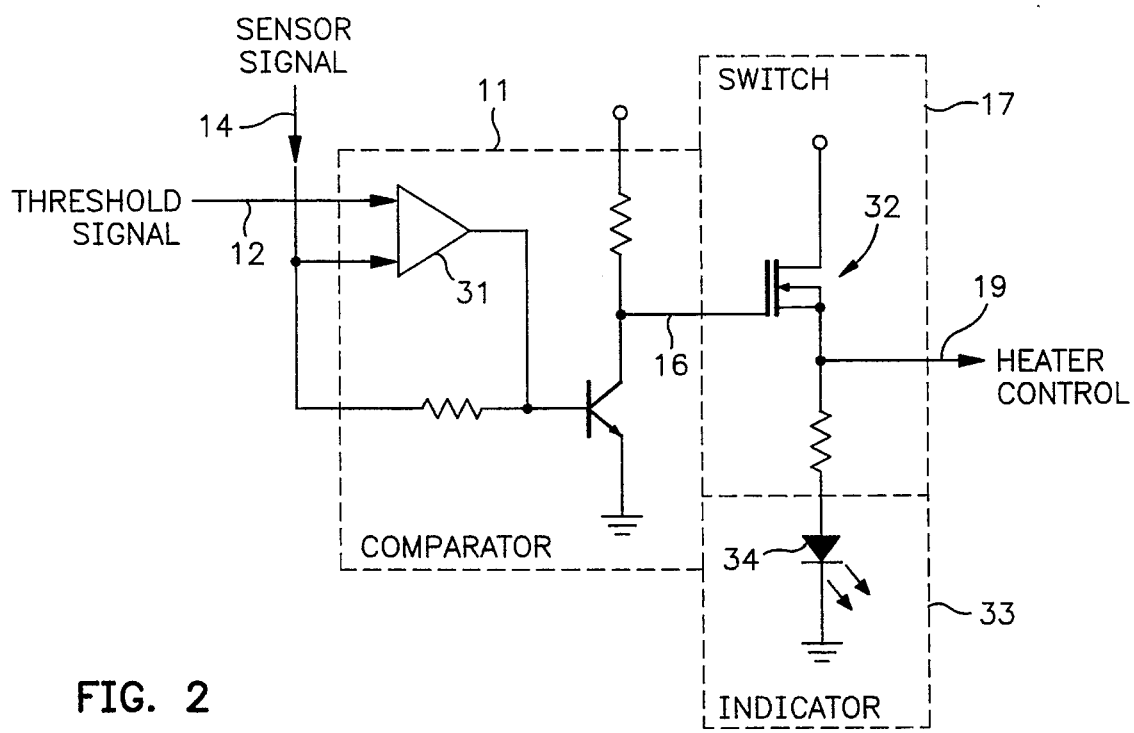
FIG. 2 is a schematic of an example of the circuitry of the comparator and switch of FIG. 1.

A portion of the circuit of FIG. 1 is shown in exemplary detail in FIG. 2. Comparator 11 is shown with differential amplifier 31 having inputs 12 and 14. Output 16 of the comparator is applied to switch 17, the essence of which is FET switch 32. An optional feature of the apparatus is that indicator 33 may be provided to inform the operator that an alarm condition has been reached. It could be LED 34 as shown, or other visual or audible indicator, or more than one type of device.

Figure 3:
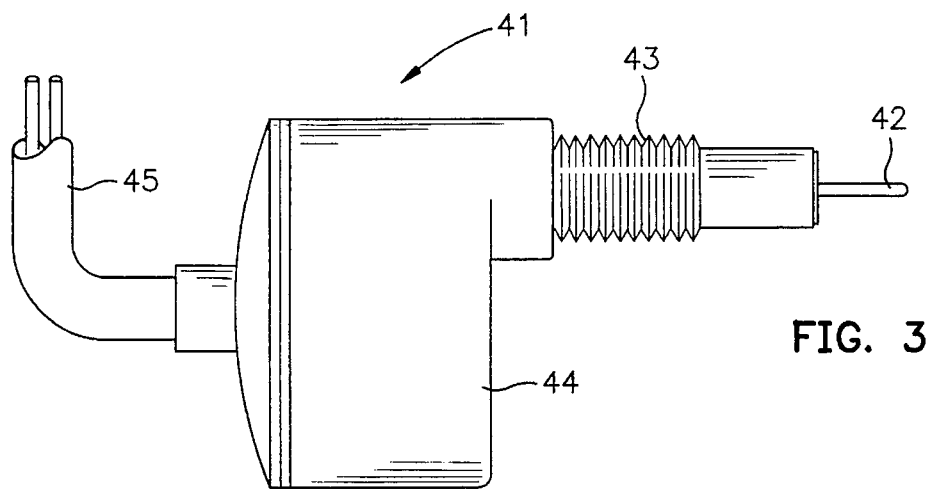
FIGS. 3, 4 and 5 are examples of thermal sensors with which the invention of FIG. 1 may be used.
Figure 4:
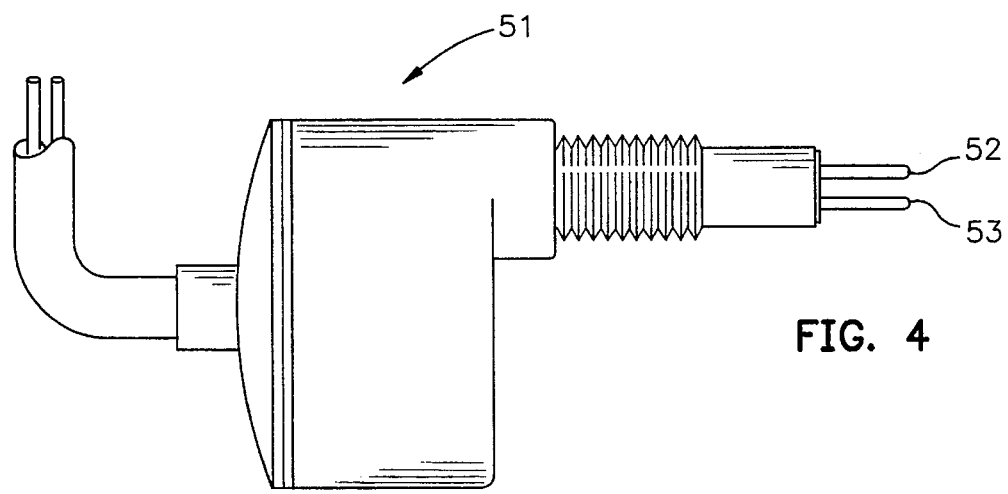
Figure 5:
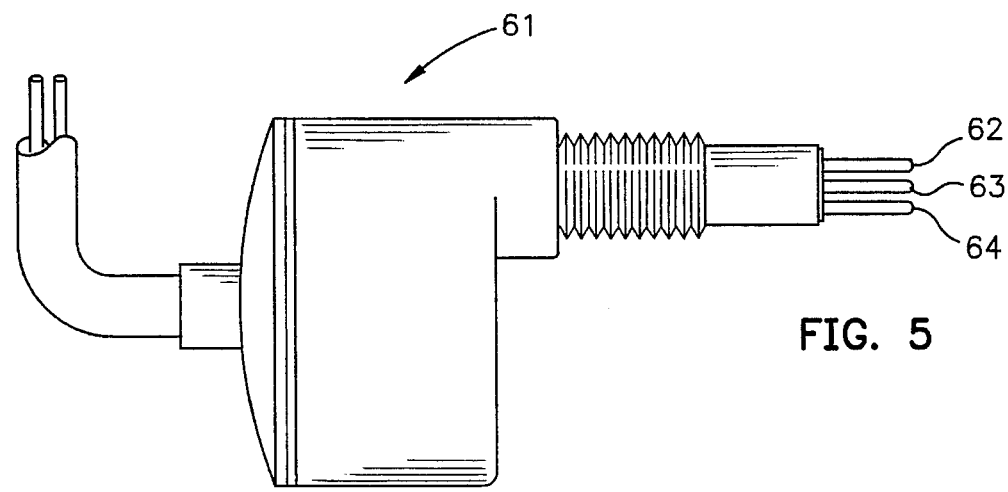

Different types of sensor devices are shown in FIGS. 3, 4 and 5. Sensor 41 in FIG. 3 has a single probe sensor element 42. Such a sensor is normally mounted in the wall of a container or duct. For that reason neck 43 is shown threaded. In some applications, body 44 may be remotely located from the probe or probes. Body 44 incorporates all the necessary electronics of the sensor, and cable 45 provides all necessary external power and signal inputs and signal outputs to external locations, including connection to the cut off circuit of this invention if remote electronics are employed. If desired, the electronics of this invention may be incorporated within body 44.

Similarly, sensor 51 in FIG. 4 has two probes 52 and 53. Otherwise there is no difference for purposes of this description.

In FIG. 5, sensor 61 is shown with three probes 62, 63 and 64 with either conductive or convective thermal connection between the separate heater element and the heated sensor.

The sensors may be operated in different ways, all the while employing the basic principles of heated sensors. Sensor 41 may have a single RTD element within probe 42. This may be a distributed element or one or more point sensors. Sensor probes may be mounted horizontally or vertically with respect to the phenomena being measured. The main common feature of heated sensors is that the resistance of the sensor element is significantly variable with temperature. In a common version, with increased heat dissipation, greater power is required to maintain a particular temperature.

In the single element RTD probe, that element acts as the reference element, the heated element and the heater. In order to do so, the principle of time sharing must be employed. With control and timer 24, heat is applied to the RTD element for a period of time to heat it. Then a reading is taken after the heater current is removed. The element is allowed to cool and another reading is taken as a reference reading. This cyclic operation may be repeated as many times as desired, or continuously.

Alternatively, probe 42 may contain an RTD element and a separate heater element. The concept of time sharing still applies, but the RTD element is not self-heated as before.

The FIG. 4 embodiment shows two probes. One is unheated and the other is heated. They may be made physically and electrically identical for precise balance and to permit either to selectively be the heated probe or the reference probe. Within probes 52 and 53 there may be a single self heated RTD element, or an RTD element and a separate heater element.

Finally, sensor 61 is shown with three probes. In this sensor embodiment, one probe is the heater, external of the other two probes. One probe is never heated and functions as the reference probe, while the other is the heated sensor probe, heated by the closely adjacent heater element. As remarked above, the heater element is thermally bonded to the heated sensor probe by convective or conductive means.

Certain parameters will by set out for purposes of example only, and not be way of limitation. The threshold temperature represented by the threshold signal, normally a voltage, may range between 0 and several hundred degrees of differential temperature. A more practical range is 40° F. to 200° F. More specifically, a useful exemplary threshold temperature is 140° F.

The comparator may be set to emit a signal to open switch 17 at any differential sensor temperature signal level above 140° F. That is, it could be opened instantaneously as soon as a differential of 140° F. is exceeded between the reference temperature and the heated sensor or it could be opened after it is exceeded by a few degrees. That is a matter of choice.

Under certain circumstances when employed as a liquid flow rate sensor the power applied to heat the heated sensor may be sufficient to take it to as high as 700° F. when dry, whereas normally when wet the liquid cools it to below 140° F. In such a case the importance of the invention becomes immediately apparent. If the liquid were suddenly gone, a significant sensor temperature rise and resistance change would occur and, if the heating aspect is not immediately shut down, the heater and/or sensor could quickly burn up. In a volatile atmosphere, such a hot spot could be very dangerous and possibly ignite explosive or combustible media, if present.

When the situation changes permitting heater temperature and heated sensor temperature (whether they are separate elements or are unitary) to rise, a significant increase can occur in as short a time as one second. The time for a major rise could range up to as much as 30 seconds but it will usually be much quicker than that.

In view of the above description it is likely that modifications and improvements will occur to those skilled in the relevant technical field which are within the scope of the appended claims.

What is claimed is:

1. In combination with a thermal sensor of the heated type having an output signal and having means for heating said sensor, the magnitude of the output signal of said thermal sensor being related to the temperature of said thermal sensor, apparatus for preventing damage to said sensor or its environment from overheating, said apparatus comprising:

an electrical signal comparator having at least two input terminals and at least one output terminal;

means for establishing a first electrical signal corresponding to a predetermined temperature threshold level and connecting said first signal to a first said comparator input terminal;

means for coupling said thermal sensor output signal to a second said comparator input terminal;

means for applying electrical power to said heating means; and switch means coupled to said output terminal of said comparator, said switch means being connected between said electrical power applying means and said heating means, said switch means selectively coupling said means for applying electrical power to said heating means pursuant to the output signal from said comparator, said comparator being configured to provide an output signal on said output terminal when said thermal sensor output signal exceeds said first signal by a predetermined amount to disconnect said electrical power applying means from said heating means.

2. The combination recited in claim 1, wherein the electrical power supplied by said applying means is a voltage and said first and thermal sensor output signals are voltages.

3. A safety device for preventing damage to or destruction of a thermal sensor or its environment from overheating due to reduced heat dissipation during operation, said thermal sensor being of the heated type having an output signal and having means for heating said sensor, the output signal of said thermal sensor being related to the temperature of said thermal sensor, said device comprising:

an electrical signal comparator having at least two input terminals and at least one output terminals;

means for establishing a first electrical signal corresponding to a predetermined temperature threshold level and connecting said first signal to a first said comparator input terminal;

means for coupling said thermal sensor output signal to a second said comparator input terminal;

means for applying electrical power to said heating means; and switch means coupled to said output terminal of said comparator, said switch means being connected between said electrical power applying means and said heating means;

said comparator being configured to provide an output signal on said output terminal when said thermal sensor output signal exceeds said first signal by a predetermined amount, said switch means selectively coupling said means for applying electrical power to said heating means pursuant to the output from said comparator to thereby disconnect said electrical power applying means from said heating means.

4. A method for preventing damage to a thermal sensor or its environment due to overheating, the thermal sensor being of the heated type and having an output signal and having means for heating said sensor and including means for selectively connecting and disconnecting electrical power to the heating means, said method comprising the steps of:

establishing a threshold first electrical signal to a comparator:

comparing the threshold signal and the thermal sensor output signal; and disconnecting the electrical power source from the means for heating the thermal sensor when the thermal sensor output signal exceeds the threshold signal by a predetermined amount.

5. The method recited in claim 4, wherein the threshold signal and the second signal are voltages.

6. The method recited in claim 4, wherein the thermal sensor comprises a single element which functions both as a reference sensor and as a heated sensor, said method comprising the additional step of intermittently applying differential electrical power to the element.

7. The method recited in claim 4, wherein the thermal sensor comprises a single probe having a sensor element and a separate heating element therein, whereby said sensor element is heated by said heating element, said method further comprising the step of selectively intermittently applying differential electrical power to said heating element so that said probe alternately functions as a heated sensor and as a reference sensor.

8. The method recited in claim 4, wherein the sensor comprises two probes, one functioning as a reference sensor and the other being a heated sensor.

9. The method recited in claim 4, wherein the thermal sensor comprises three probes, one being a reference sensor, one being a heating element, and the third being a heated sensor.

10. Safety apparatus for a fluid level and flow sensor to prevent overheating, said apparatus comprising:

a thermal sensor of the heated type having an output electrical signal, the magnitude of the output signal being dependent upon the temperature of said thermal sensor;

means for heating said thermal sensor;

means for applying electrical power to said heating means;

switch means in said electrical power applying means to selectively interrupt the power applied to said heating means;

an electrical signal comparator having at least two inputs and at least one output, said output being operatively coupled to said switch means;

means for connecting the output electrical signal from said thermal sensor from said thermal sensor to a first one of said inputs; and means for applying a threshold signal to a second one of said inputs;

said comparator being configured to provide an output signal to said switch means to remove the power from said heating means when said output electrical signal exceeds said threshold signal by a predetermined amount.

11. The apparatus recited in claim 10, wherein said thermal sensor is thermally coupled and electrically isolated from the fluid being sensed and said heating means is thermally coupled to said thermal sensor and electrically isolated from the fluid being sensed.

12. The apparatus recited in claim 10, wherein said power supply is an electrical voltage and said thermal sensor output signal and said threshold signal are voltages.

13. The apparatus recited in claim 10, wherein said thermal sensor comprises a single element which functions both as a heated sensor and as a reference sensor, said apparatus further comprising means for intermittently applying differential electrical power to cause said element to alternatively function as said heated sensor and as said reference sensor.

14. The apparatus recited in claim 10, wherein said thermal sensor comprises a single probe having a sensor element and a separate heating element therein, whereby said sensor element is heated by said heating element, said apparatus further comprising means for selectively intermittently applying electrical power to said heating element so that said probe alternately functions as a heated sensor and as a reference sensor.

15. The apparatus recited in claim 10, wherein said thermal sensor comprises two probes, one functioning as a reference sensor and the other being a heated sensor.

16. The apparatus recited in claim 10, wherein said thermal sensor comprises three probes, one being a reference sensor, one being a heating element, and the third being a heated sensor.

* * * * *